May 15, 1928.
M. P. HOLMES
1,670,154
CLUTCH MECHANISM FOR MINING MACHINE TRUCKS
Filed Sept. 26, 1921
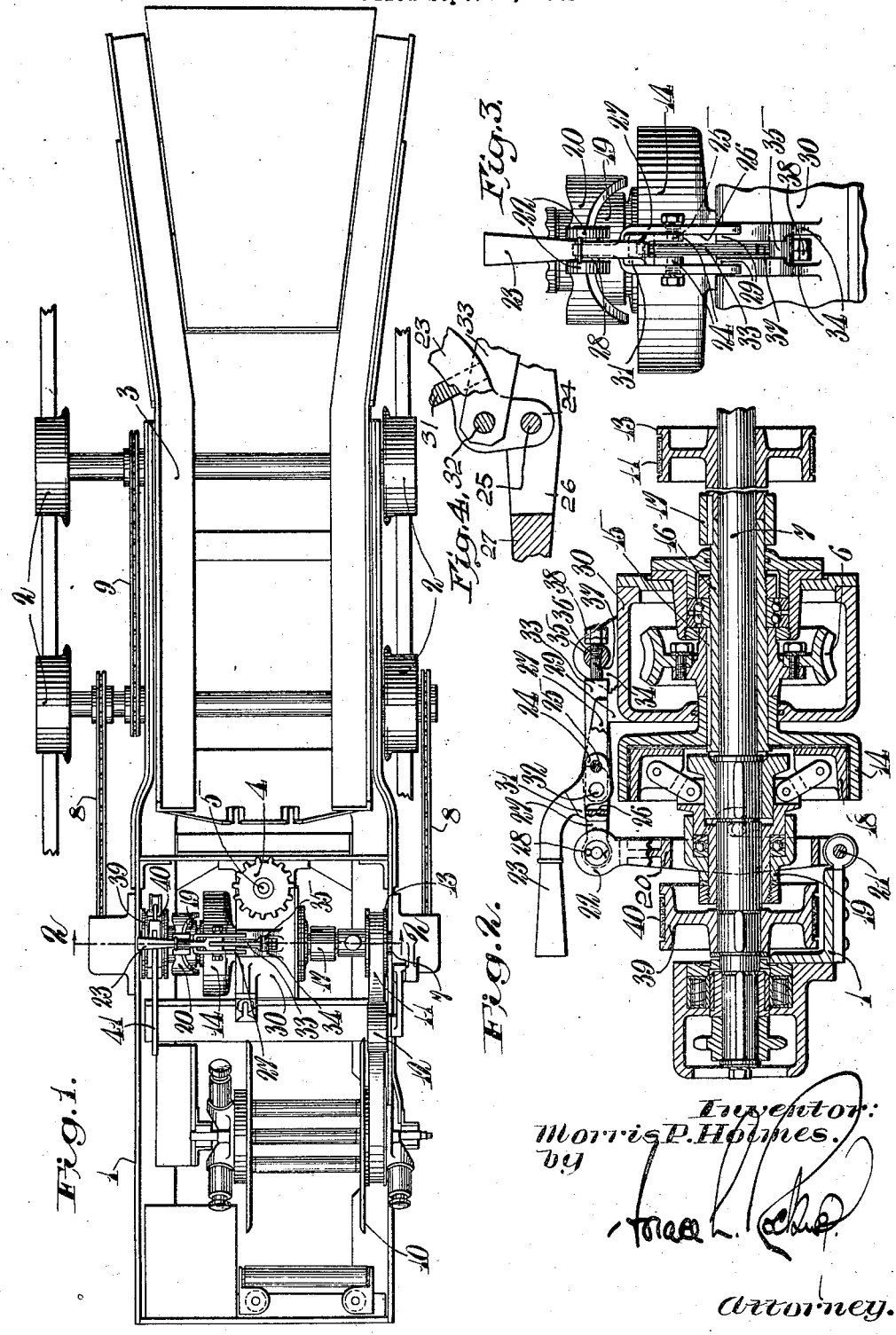
Inventor:
Morris P. Holmes.
by
Attorney.

Patented May 15, 1928.

1,670,154

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

CLUTCH MECHANISM FOR MINING-MACHINE TRUCKS.

Application filed September 26, 1921. Serial No. 503,346.

My invention relates to mining machine trucks.

It has among its objects to provide an improved controlling mechanism for a mining machine truck. A further object of my invention is to provide improved controlling means for the truck driving mechanism including improved means for operating and controlling the truck driving friction clutch. These and other objects and advantages of my improved construction will, however, hereinafter more fully appear.

In the accompanying drawings I have shown, for purposes of illustration, one embodiment which my invention may assume in practice.

In these drawings,—

Fig. 1 is a plan view of a mining machine truck equipped with this form of my improvement.

Fig. 2 is a detail sectional view on line 2—2 of Fig. 1, the parts being shown in clutch engaging position.

Fig. 3 is an enlarged detail plan view of the controlling lever mechanism.

Fig. 4 is an enlarged fragmentary detail sectional view showing the control lever mechanism in clutch releasing position.

In this illustrative construction I have shown a mining machine truck including a truck frame 1 mounted on wheels 2 and adapted to carry a mining machine on a mining machine receiving portion 3, herein, as preferably, tiltable relative to the body of the truck 1. As shown, the truck is also adapted to have its wheels driven by a rotating part of a mining machine thereon, through a truck driving member 4 adapted to mesh with such a part. Herein this member 4 is rotatable with a vertically disposed worm shaft 5 journaled on the truck frame and the latter is operatively connected to a worm gear 6 which is itself operatively connected, as hereinafter described, to a transverse truck driving shaft 7, in turn connected through suitable chain and sprocket connections 8, 9 at its opposite ends to the axles of the wheels 2. As in a usual construction, a reel 10 is also carried by the truck frame in rear of the shaft 7 and operatively connected thereto through a belt connection 11 and a belt tightener 12.

In my improved construction, it will be observed that a pulley 13 for the reel belt 11 is disposed on one side of the worm gear 6 and on the opposite side of the worm gear from a shaft and truck drive controlling friction clutch. Herein, this clutch includes an external clutch member 14, keyed at 15 to a sleeve 16 to which the pulley is connected by a coupling 17, and a cooperating internal clutch member 18, herein of the toggle operated expansible type and operable by a member 19 movable longitudinally of the shaft. As shown, this member 19 is operated by a vertically disposed shipper yoke 20 pivoted at its lower end at 21 beneath the shaft and having spaced extensions 22 on its upper end to which an operating member 23 is operatively connected as hereinafter described. As shown, this operating member is of bell crank form with its handle portion longer than its other arm and has lugs 24 on its short arm extending into and pivoted at 25 in a slot 26 in a member 27 pivotally connected at 28 at one end to the extensions 22 on the member 20 and having its other end slidable longitudinally of the shaft 7 on a surface 29 on the truck frame, herein formed on a lubricant casing 30 enclosing the worm and worm gear. Attention is also directed to the fact that the operating member 23 is provided with a lug 31 engageable with the member 27 at the left hand end of the slot 26 (Fig. 2) and is also operatively connected at a point at the left of the pivot 25 (same figure) and by a pivot pin 32 to one end of a link 33, slidably and pivotally connected to a stationary part of the frame, herein between upstanding lugs 34 on the casing 30 and through a member 35 connecting said lugs and provided with a transverse opening 36 therein in which a threaded member 37 forming an extension of the link 33 is longitudinally and angularly movable within limits established by nuts 38 on the end of the threaded member. Attention is also directed to the fact that on the shaft 7 and on the opposite side of the member 20 from the friction clutch, a brake drum 39 is provided, the drum having a cooperating brake band 40 operable by any suitable operating lever as the lever 41.

In the operation of my improved mechanism it will be evident that the truck movement may be controlled at will through the operating member 23 and whether the clutch elements 14 and 18 are connected or not the sleeve 16 will be actuated in such manner as to permit the pulley 13 to drive the reel provided the belt tightener 12 is thrown down. More specifically, it will be observed that in the position shown in Fig. 2 the parts 14 and 18 will be clutched together and the members 27 and 33 will be under tension and owing to the nature of the connections the parts will be automatically held in this clutch engaging position, the portion 31 then engaging the top of the member 27. When it is desired to release the clutch, the member 23 will be swung in a clockwise direction and this will permit the pivot 32 to move around the pivot 25 and substantially the distance between these pivots will be added to the distance between the points 22 and 35, and it will be evident that if the clutch should stick, by throwing the parts further backward even than is shown in Fig. 4, the clutch could be positively released. Owing to the weight of the lever 23 being to the right of its pivot point when in the position shown in Fig. 4, the parts will tend to maintain that position also.

As a result of my improvement it will be observed that it is possible to drive the reel 10 from the pulley 13 disposed on the opposite side of the worm gear casing from the friction clutch while still operating the friction controlling mechanism from a point at the side of the truck adjacent the truck brake operating mechanism, that is, both of these mechanisms are conveniently operable from the operator's position. It is also to be noted that the connections for operating the clutch are of such nature that but little power is required and the parts are maintained in their off and on positions respectively.

While I have in this application specifically described one embodiment which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a clutch mechanism, coaxial driving and driven friction clutch elements, and means including an element reciprocable coaxially of said element for forcing them into frictional engagement and interrupting frictional engagement thereof, and mechanism for moving said last mentioned element to effect clutching relation comprising a plurality of separately pivoted elements and means including an operating member pivotally mounted on one of said pivoted elements for placing said elements under increasing tension as the clutch is loaded.

2. In a clutch mechanism, coaxial driving and driven friction clutch elements, and means including an element reciprocable coaxially of said elements for forcing them into frictional engagement and interrupting frictional engagement thereof, and mechanism for moving said last mentioned element to effect clutching relation including a plurality of longitudinally differently positioned movable connector elements placed under increasing tension on loading of said clutch and a manually movable portion connecting the adjacent ends of said last mentioned elements and placed under increasing compression when said clutch is loaded, said portion being pivotally mounted on one of said last mentioned elements.

3. In a clutch mechanism, coaxial driving and driven friction clutch elements, and means including an element reciprocable coaxially of said elements for forcing them into frictional engagement and interrupting frictional engagement thereof, and mechanism for moving said last mentioned element to effect clutching relation including a plurality of longitudinally differently positioned movable connector elements placed in tension on loading of said clutch and a manually movable portion connecting the adjacent ends of said last mentioned elements and pivotally mounted on one of the latter, said portion being movable substantially into parallelism therewith and placed in compression when said clutch is loaded.

4. In a clutch mechanism, cooperating clutch elements one of which is movable relative to the other to effect loading and unloading, a clutch shipper movable to operate said movable element, and mechanism for operating said shipper including a pivoted operating member having its free end normally disposed closely adjacent said shipper and swingable outwardly from the same during loading of the clutch.

5. In a clutch mechanism, cooperating clutch elements one of which is movable relative to the other to effect loading and unloading, a clutch shipper movable to operate said movable element, and mechanism for operating said shipper including a member pivotally connected to said shipper, an operating member pivoted to said member, and a link pivoted to said operating member on a non-coincident axis, and means providing an abutment affording a slidable and pivotal connection for the other end of said link.

6. In a clutch mechanism, cooperating clutch elements one of which is movable relative to the other to effect loading and unloading, a clutch shipper movable to operate said movable element, and mechanism for operating said shipper including a slotted member pivoted to said shipper, a bell crank operating member pivoted in the slot in said member, and a link pivoted to said operating member on a non-coincident axis and having at its other end a mounting permitting pivoting thereon and longitudinal movement relative thereto.

7. In a clutch mechanism, cooperating clutch elements one of which is movable relative to the other to effect loading and unloading, a clutch shipper movable to operate said movable element, and mechanism for operating said shipper including a slotted member pivoted to said shipper, means affording a surface upon which said member is slidable, an operating member pivoted in said slotted member, and a link pivoted to said operating member and connected for longitudinal and angular movement.

8. In a clutch mechanism, cooperating clutch elements one of which is movable relative to the other to effect loading and unloading, a clutch shipper movable to operate said movable element, and mechanism for operating said shipper including a slotted member pivoted to said shipper, means affording a surface on which said member is slidable, an operating bell crank pivoted in the slot in said member and having a shoulder engageable therewith, and a link pivoted to said operating member on a non-coincident axis and having at its other end means permitting sliding and pivoting thereon.

9. In a clutch mechanism, cooperating clutch elements one of which is movable relative to the other to effect loading and releasing, a clutch shipper movable to operate said movable element, and mechanism for actuating said shipper including a member pivotally connected to said shipper, a member pivotally mounted at one end, and means connecting the opposite ends of said members and having a handle portion so arranged at an angle to said connecting means that it automatically maintains said members in clutch release position.

10. In a clutch mechanism, coaxial driving and driven friction clutch elements and means including an element reciprocable coaxially of said elements for forcing them into frictional engagement and for disengaging the same, and mechanism for moving said last mentioned element to effect clutching relation comprising a plurality of separately pivoted elements, one of said elements being longitudinally slidable, and means including an operating member pivotally mounted on said slidable element for placing said pivoted elements under increasing tension as the clutch is applied.

11. In a clutch mechanism, coaxial driving and driven friction clutch elements, and means including an element reciprocable coaxially of said elements for forcing them into frictional engagement and for disengaging the same, and mechanism for moving said last mentioned element to effect clutching relation comprising a plurality of separately pivoted longitudinally slidable elements, and means including an operating member pivotally mounted on one of said slidable elements for placing the same under increasing tension as the clutch is applied.

12. In a clutch mechanism, coaxial driving and driven friction clutch elements and means including an element reciprocable coaxially of said elements for forcing them into frictional engagement and for disengaging the same, and mechanism for moving said last mentioned element to effect clutching relation comprising a pivoted shipper yoke cooperating with said coaxial element, a slidable member pivotally connected to said shipper yoke, a second slidable pivoted member, and means including an operating element pivotally connected to said slidable members for placing the same under increasing tension as the clutch is loaded.

13. In a clutch mechanism, coaxial driving and driven friction clutch elements and means including an element reciprocable coaxially of said elements for forcing them into frictional engagement and for interrupting frictional engagement thereof, and means for moving said last mentioned element to effect clutching relation comprising a plurality of separately pivoted elements, one of said elements being pivotally connected to said coaxial element while the other element is pivotally connected to a stationary abutment, and means including an operating member pivotally connected to said elements for placing the same under increasing tension as the clutch is loaded.

14. In a clutch mechanism, coaxial driving and driven friction clutch elements and means including an element reciprocable coaxially of said elements for forcing them into frictional engagement and for interrupting frictional engagement thereof including a shipper member, and means for moving said last mentioned element to effect clutching relation comprising a plurality of separately pivoted elements, said elements being pivoted at their remote ends to said shipper member and a stationary abutment respectively, and means including an operating member pivotally connected to said elements at their adjacent ends for placing said elements under increasing tension as the clutch is loaded.

In testimony whereof I affix my signature.

MORRIS P. HOLMES.

CERTIFICATE OF CORRECTION.

Patent No. 1,670,154.                                    Granted May 15, 1928, to

MORRIS P. HOLMES.

It is hereby certified that error appears in the printed specification of the above numbered patent requiring correction as follows: Page 2, line 55, claim 1, for the word "element" read "elements"; and that the said Letters Patent should be read with this correction therein that the same may conform to the record of the case in the Patent Office.

Signed and sealed this 3rd day of July, A. D. 1928.

(Seal)                                                            M. J. Moore,
                                                                      Acting Commissioner of Patents.